United States Patent
Brown et al.

(10) Patent No.: US 9,457,291 B2
(45) Date of Patent: Oct. 4, 2016

(54) COMBINED COLLECTOR AND DISTRIBUTOR

(71) Applicants: Steven C. Brown, Amherst, NY (US); John P. Ricotta, Kenmore, NY (US); Andrew P. Dybdahl, Lockport, NY (US); Guang X. Chen, Williamsville, NY (US)

(72) Inventors: Steven C. Brown, Amherst, NY (US); John P. Ricotta, Kenmore, NY (US); Andrew P. Dybdahl, Lockport, NY (US); Guang X. Chen, Williamsville, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 86 days.

(21) Appl. No.: 14/642,884

(22) Filed: Mar. 10, 2015

(65) Prior Publication Data
US 2015/0174505 A1 Jun. 25, 2015

Related U.S. Application Data

(63) Continuation of application No. 13/923,836, filed on Jun. 21, 2013, now Pat. No. 9,004,460.

(51) Int. Cl.
*B01D 3/00* (2006.01)
*B01F 3/04* (2006.01)

(52) U.S. Cl.
CPC ........... *B01D 3/008* (2013.01); *B01F 3/04078* (2013.01); *B01D 3/00* (2013.01); *B01F 3/04007* (2013.01)

(58) Field of Classification Search
CPC .. B01F 3/04; B01F 3/04007; B01F 3/04078; B01D 3/008; B01D 3/00; B01D 3/32

USPC .................. 261/96, 97, 113, 114.5; 202/158
See application file for complete search history.

(56) References Cited

U.S. PATENT DOCUMENTS

| | | | |
|---|---|---|---|
| 5,224,351 A | 7/1993 | Jeannot et al. | |
| 5,645,770 A | 7/1997 | McNulty et al. | |
| 5,935,389 A | 8/1999 | Hine et al. | |
| 6,086,055 A | 7/2000 | Armstrong et al. | |
| 7,114,709 B2 * | 10/2006 | Ender | B01D 3/008 261/110 |
| 8,317,166 B2 * | 11/2012 | Headley | B01D 3/008 261/97 |
| 2004/0099969 A1 | 5/2004 | Larson et al. | |
| 2010/0162891 A1 | 7/2010 | Xu et al. | |

FOREIGN PATENT DOCUMENTS

WO WO 2004/091748 A1 10/2004

* cited by examiner

*Primary Examiner* — Robert A Hopkins
(74) *Attorney, Agent, or Firm* — Robert J. Hampsch

(57) ABSTRACT

A combined collector and distributor for a distillation column that includes a collector portion connected to a distributor portion. The distributor portion includes a channel-like distributor to distribute liquid into an underlying packing. The collector portion has spaced rows of collection elements that cover the open spaces and distribution elements of the distributor portion and one or more rectangular sumps into which descending liquid drains from the collection elements. The liquid in turn drains from the rectangular sump or sumps into a pre-distribution box located within a header of the distributor portion. The collection elements that cover the open spaces are set at higher positions than the collection elements covering the distribution elements to form chimneys to allow the ascending vapor to escape from the collector portion.

9 Claims, 6 Drawing Sheets

COMBINED COLLECTOR AND DISTRIBUTOR

CROSS REFERENCE TO RELATED APPLICATIONS

The present application is a continuation application that claims the benefit of and priority to U.S. patent application Ser. No. 13/923,836 filed on Jun. 21, 2013, now issued as U.S. Pat. No. 9,004,460 issued on Apr. 14, 2015.

FIELD OF THE INVENTION

The present invention provides a combined collector and distributor for collecting and distributing descending liquid having a collector portion to collect the descending liquid and a distributor portion to distribute the descending liquid. More particularly, the present invention relates to such a combined collector and distributor in which the distributor portion is a channel-like distributor and the collector portion has rows of collection elements that feed descending liquid to a rectangular sump that in turn feeds liquid to the distributor portion and that covers distribution channels of the distributor portion and open spaces between the distribution channels in a staggered arrangement to allow for passage of ascending vapor.

BACKGROUND

Various mixtures of substances are separated by conducting distillation processes within distillation columns. The separation is conducted by contacting an ascending vapor phase of the mixture with a descending liquid phase. As a result of such contact, the ascending vapor phase becomes ever more rich in the more volatile or light components as it ascends and the descending liquid phase becomes ever more rich in the less volatile or heavy components as it descends.

Packings can be used to facilitate the contact of the liquid and vapor mixture phases within the distillation column that can be of either of the random or structured type of packing. In random packings, individual packing elements are located in packing beds. In structured packing, corrugated sheets of packing are provided in an arrangement where the corrugations cross one another. In both types of packings, the descending liquid phase forms a descending film on the outer surfaces thereof that is contacted by the ascending vapor phase. In structured packing, the crossing of the corrugations helps to distribute the contact in a transverse direction to the column access. Typically, the structured packing is deployed in an arrangement where an overlying layer of corrugated sheets is oriented at right angles to an underlying layer of corrugated sheets.

The number of beds of packing will of course depend on the type of distillation being conducted and the substances to be separated. However, as between packing beds, the descending liquid is collected from an overlying packing bed by a liquid collector and the collected liquid is then distributed to an underlying backing bed by a liquid distributor connected to the liquid collector. The liquid collector and liquid distributor are designed to allow the ascending vapor phase to pass from the underlying packing bed to the overlying packing bed. When the descending liquid leaves a packing bed, the liquid may have a varying concentration of substances as viewed in a transverse direction. It is desired, however, that the concentration of substance be as uniform as possible so that the distillation column can function at a level consistent with its design. Therefore, it is desired to thoroughly mix the liquid before introducing it to the underlying packing bed. Additionally, it is also desired that the liquid collector and liquid distributor are designed so that they produce a low pressure drop for the ascending vapor as the vapor passes through such column internals so that upward vapor flow is not impeded.

A typical form of a collector is a chimney tray collector in which a deck-like plate is provided with rows of chimneys situated on either side of an open rectangular sump to allow the ascending vapor to flow through the deck-like plate. The chimneys are capped with hats that that collect part of the descending liquid and direct the same into the open rectangular sump. Another part of the liquid is collected on the deck-like plate between the chimneys and is directed into the open rectangular sump. The open rectangular sump has a bottom opening that is connected by a conduit to the liquid distributor. A known form of a liquid distributor is a channel-type distributor having open, distribution channels connected to a central header. An open pre-distribution box is situated within the header to receive liquid from the liquid collector and distribute the liquid to the central header. The distribution channels and the central header are provided with perforate bottom walls to distribute the liquid across the distillation column to an underlying packing bed. Open spaces between the distribution channels permit the vapor to flow to the chimneys in the liquid collector.

As can be appreciated, a liquid distributor and collector, such as described above take up space within a distillation column and represent part of the required height of the column. As could be appreciated by those skilled in the art, taller distillation columns are more expensive to fabricate than more compact columns. Further, taller the columns require more expensive supporting structures and equipment such as cold boxes for cryogenic distillations and longer piping runs and etc. In order to decrease the height requirements imposed by separate collectors and distributors, combined liquid collectors and distributors have been produced. An example of such a device is disclosed in U.S. Pat. No. 5,645,770 in which hats are placed on a series of chimneys mounted on a tray. The hats are oriented to direct the descending liquid to opposite sides of the plate. Liquid is discharged from distribution channels located at the bottom of the tray or from openings in the bottom of the tray. In the combined collector and distributor of this patent, the flow of ascending vapor is somewhat impeded given that the ascending vapor is constrained to pass through an array of chimneys. Furthermore, given that the collected liquid is distributed to opposite sides of the distillation column shell by the hats, the degree to which liquid mixing occurs is limited to a center through located in the bottom of the distributor portion of the device.

As will be discussed, the present invention provides a combined liquid collector and distributor having a lower resistance to the up flow of the ascending vapor than the prior art and that provides a greater degree of mixing than is possible with similar prior art devices.

SUMMARY OF THE INVENTION

The present invention provides a combined collector and distributor for collecting and distributing descending liquid within a distillation column that comprises a collector portion connected to a distributor portion. The distributor portion includes a channel-like distributor having two opposed arrays of spaced apart, parallel distribution channels, at least one header located between and feeding the descending liquid to the distribution channels, open spaces situated between the distribution channels for passage of the ascending vapor and at least one open pre-distribution box located within the at least one header. The distribution channels and the at least one header have perforate bottom walls to distribute the descending liquid across the distillation column and open top portions. The collector portion includes two rows of collection elements configured to collect the descending liquid within the distillation column and covering the open spaces and the open top portions of the distribution channels to prevent the descending liquid from by-passing the collector portion. The collection elements are staggered so that the collection elements alternate between higher and lower positions at locations above the open spaces and the distribution channels, respectively. This forms chimney-like regions within the open spaces and below the collection elements at the higher positions to enable ascending vapor flow through the combined collector and distributor. The two rows of collection elements are spaced apart from one another and at least one rectangular region situated between the two rows of collection elements and the collection elements have open ends, adjacent the at least one rectangular region, from which descending liquid collected in the collection elements flows from the collection elements. At least one rectangular sump is located within the at least one rectangular region, between the two rows of collection elements so as to receive the descending liquid flowing from the collection elements and having a bottom opening to discharge the descending liquid into the at least one open pre-distribution box.

The forgoing combined collector and distributor has two major advantages over the prior art. Since the distributor portion is formed by means of a channel-like distributor, it provides a greater open area for the flow of the ascending vapor than prior art designs utilizing pan type distribution elements and chimneys. Further, since the descending liquid is collected by collection elements that feed one or more sumps, the liquid is mixed to a much large extent than prior art devices in which the liquid is distributed to the sides of a pan-like distributor. In this regard, the descending liquid in the present invention is introduced into a pre-distribution box and then into the header provides even greater mixing of the descending liquid prior to distribution from the perforate bottom walls of the distribution channels and the central header.

Where a combined collector and distributor in accordance with the present invention is used in very wide columns, the channel-like distributor can be provided with two, parallel rectangular headers connected to the two opposed arrays of spaced apart, parallel distribution channels and two open pre-distribution boxes located within the two, parallel rectangular headers. A central array of spaced apart, parallel distribution channels connects the two, parallel rectangular headers and has the perforate bottom walls, additional open top portions and additional open spaces situated between the distribution channels of the central array for passage of the ascending vapor. In such embodiment, the at least one rectangular region is two rectangular regions and, the at least one rectangular sump is two rectangular sumps situated side by side within the two rectangular regions. One of the two opposed rows of collection elements feeds one of the two rectangular sumps and the other of the two opposed rows of collection elements feeds the other of the two rectangular sumps. An intermediate row of the collection elements covers the additional open spaces and the open top portions of the central array of distribution channels and is positioned between the two rows of collection elements so as to form the two rectangular regions. The intermediate row of collection elements is oriented with the open ends thereof are adjacent the two rectangular sumps. As a result, the descending liquid collected in the intermediate row of the collection elements is fed to the two rectangular sumps out of the open ends thereof. The collection elements of the intermediate row are staggered so that the collection elements alternate between higher and lower positions at locations above the additional open spaces and the additional open top portions of the central array of distribution channels, respectively. This forms further chimney-like regions within the additional open spaces and the collection elements of the intermediate row at the higher positions to enable ascending vapor flow through the combined collector and distributor at the intermediate row of the collection elements.

In the foregoing embodiment of the invention, the two rows of collection elements can be two rows of hat-like elements and the central row of collection elements can be a central row of hat-like elements. Each of the hat-like elements has an elongated, channel-like configuration. The hat-like elements in the higher positions are connected to hat-like elements in the lower positions. The hat-like elements in the lower positions are in turn connected to open top portions of the two opposed arrays of distribution channels and to the additional open top portions of the central array of distribution channels and the two rectangular sumps are connected to side regions of the two opposed arrays of distribution channels and the central array of distribution channels, also situated adjacent to the top, open portions.

Alternatively, in a more narrow distillation column, the channel-like distributor has one open rectangular header and one open pre-distribution box located within the one open rectangular header. The collector portion includes one rectangular sump. In such embodiment, the two rows of collection elements can be formed by two rows of hat-like elements where each of the hat-like elements has an elongated, channel-like configuration. The hat-like elements in the higher positions are connected to hat-like elements in the lower positions and the hat-like elements in the lower positions are connected to the open top portions of the two opposed arrays of spaced apart, parallel distribution channels. The rectangular sump is connected to side regions of the two opposed arrays of spaced apart, parallel distribution channels situated adjacent to the top, open portions.

In any embodiment of the present invention, the distribution channels in each of the two opposed arrays can have an ever increasing length, reaching a maximum length at a midpoint of each of the arrays and a minimum length at the ends of each of the arrays such that outer regions of the hats follow the inner curvature of a shell of the distillation column. Likewise, the collection elements in each of the two rows of collection elements can have the ever increasing length, reaching the maximum length at a midpoint of each row and the minimum length at the ends of each of the two rows such that outer regions of the collection elements follow the inner curvature of the shell of the distillation column. Furthermore, any embodiment of the present invention can be provided with a wiper band that comprise an annular, plate-like element, at its outer periphery, in contact with the shell of the distillation column to collect the descending liquid flowing downwardly along the shell of the distillation column and, at is inner periphery, situated between the collection elements in the higher positions and the lower positions at the two rows of collection elements. Inner tab-like elements located at an inner periphery of the annular, plate-like element and beneath the collection elements in the higher positions define openings in registry with the collection elements located at the lower positions to so that the descending liquid collected on the annular-plate-like element is directed only into the collection elements located at the lower positions and is prevented from flowing below the collection elements located at the upper positions. The annular, plate-like element has two opposed arcuate end sections adjacent the outermost of the collection elements of the two rows of collection elements.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

FIG. 4 is a fragmentary, top plan view of FIG. 1;

DETAILED DESCRIPTION

Figure 1:
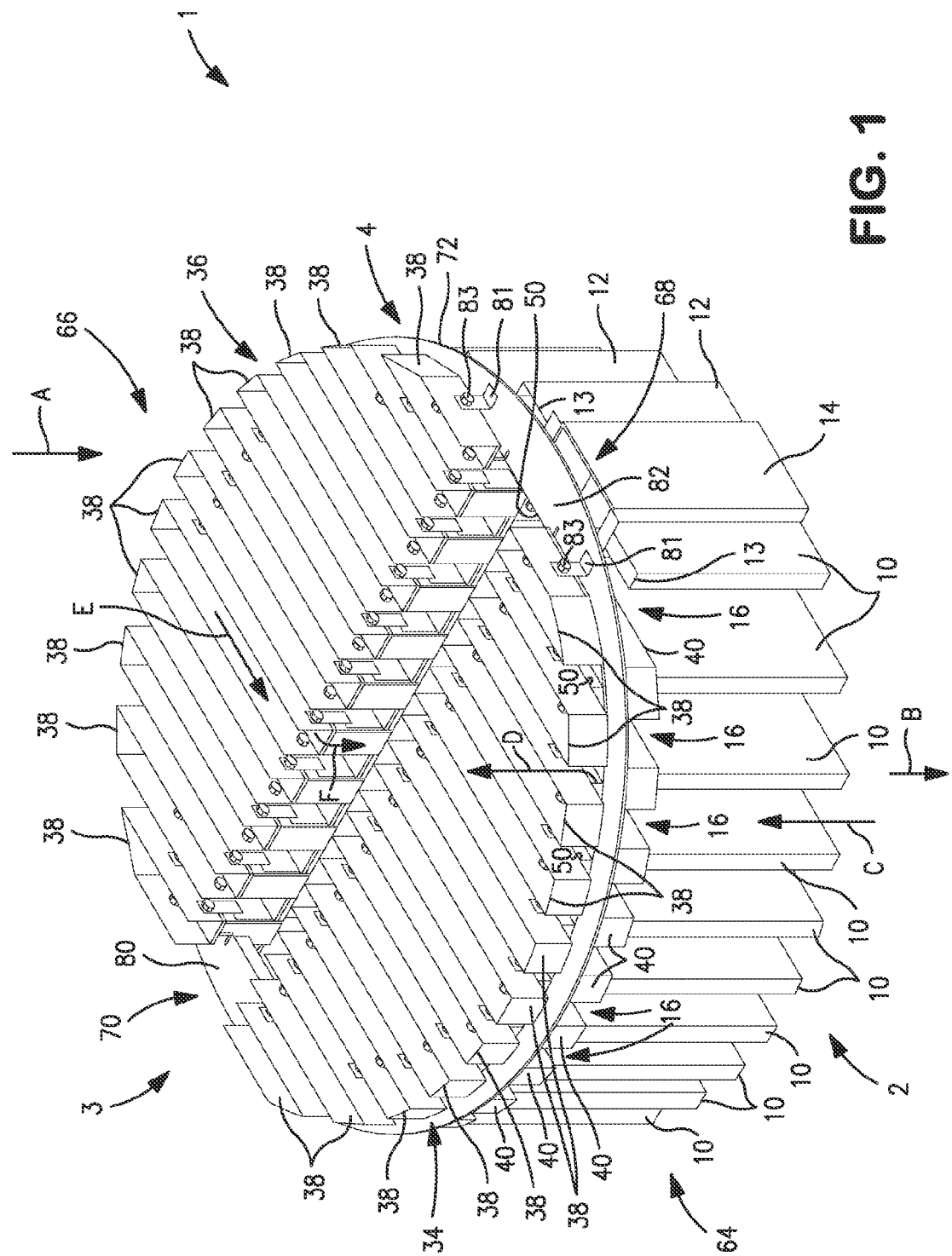
FIG. 1 is a perspective view of a combined collector and distributor in accordance with the present invention.

With reference to FIG. 1, a combined collector and distributor 1 in accordance with the present invention is illustrated. Combined collector and distributor 1 has a distributor portion 2 and a collector portion 3. Combined collector and distributor 1 is designed to mounted within a distillation column to collect descending liquid from an overlying packing bed that descends in a direction of arrowhead "A" with the use of collector portion 3 and distribute the descending liquid to an underlying packing bed by means of distributor portion 2 in a direction of arrowhead "B". At the same time, ascending vapor from the underlying packing bed, in a direction of arrowhead "C", enters the distributor portion 2 and is discharged from the collector portion 3 in a manner shown by arrowhead "D". In order to prevent liquid from seeping down an internal surface of the distillation column and bypassing the combined collector and distributor 1, a wiper band 4 is provided.

Figure 2:
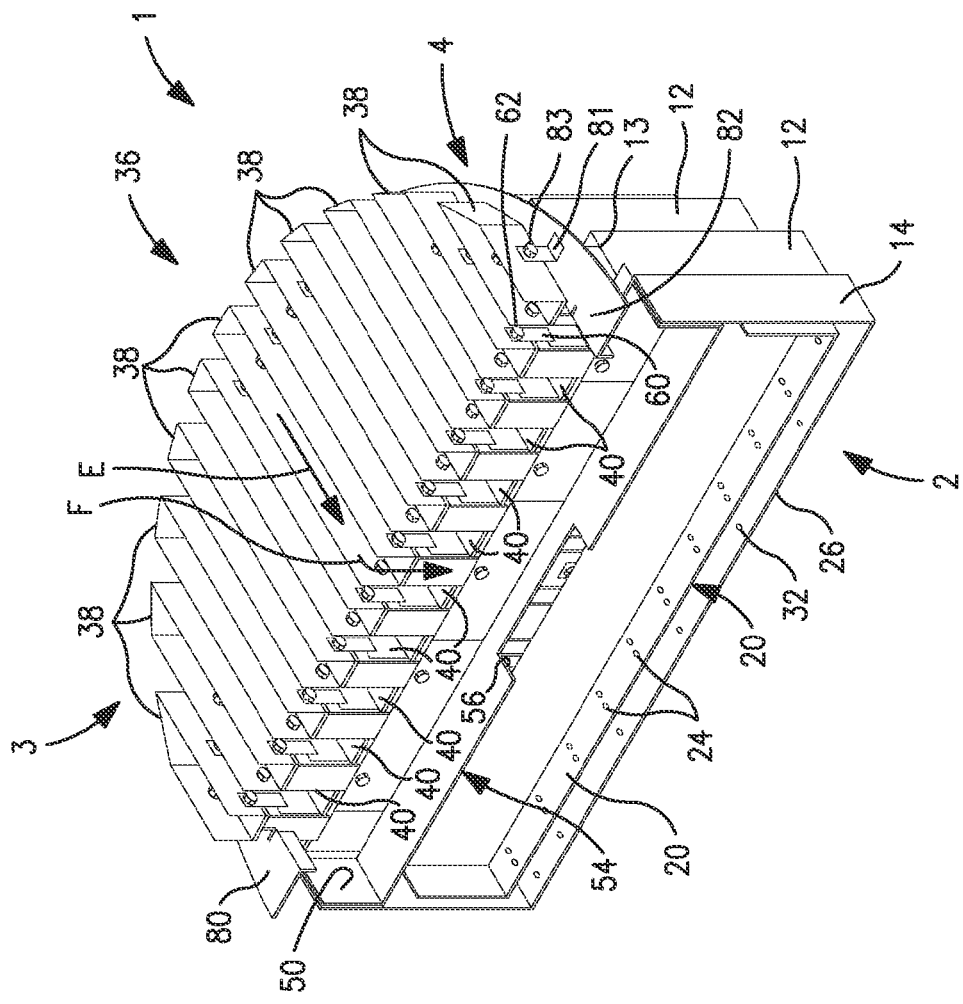
FIG. 2 is a sectional view of FIG. 1.
Figure 3:
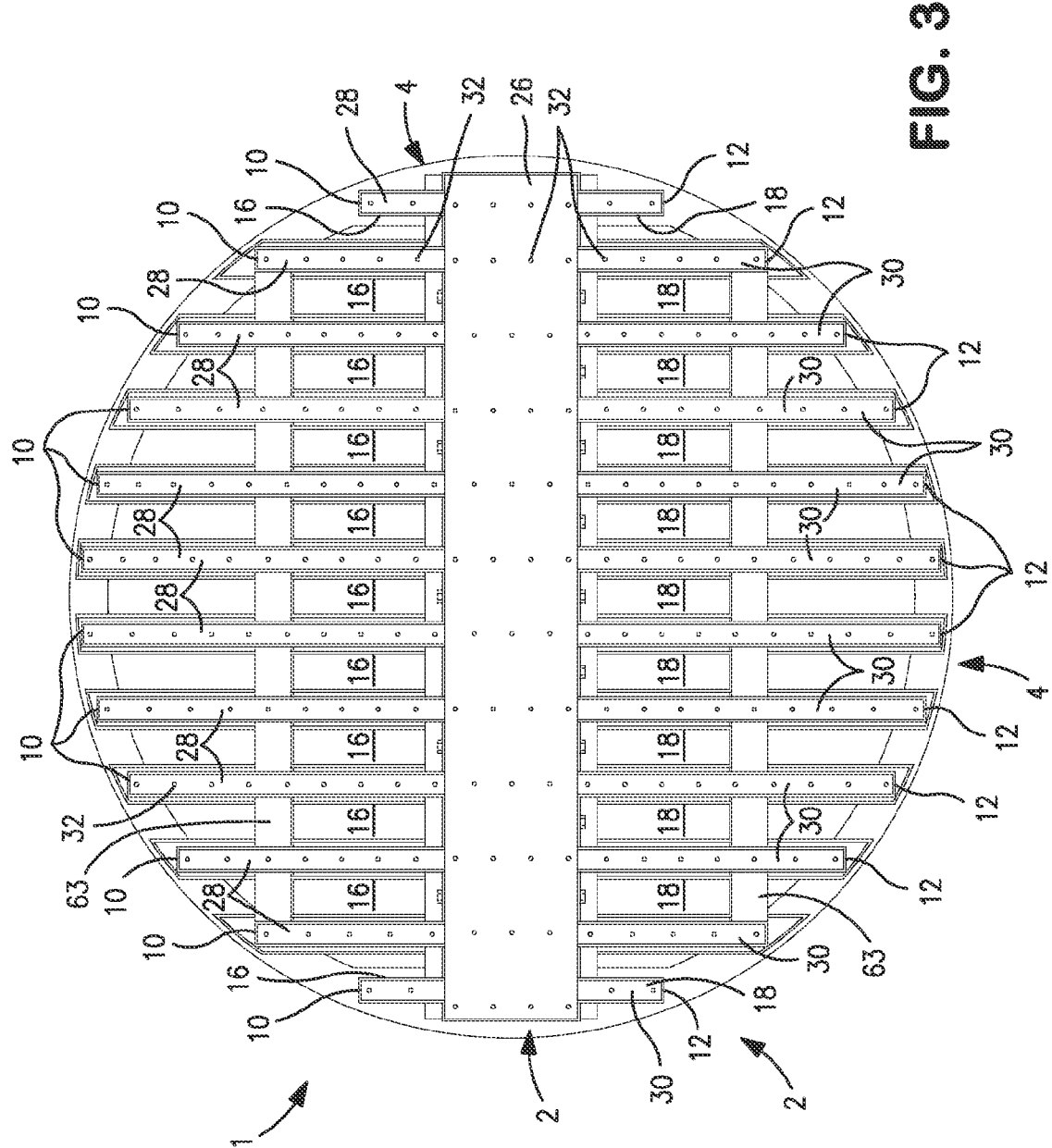
FIG. 3 is a bottom plan view of FIG. 1.

With additional reference to FIGS. 2 and 3, the distributor portion 2 is in the form of a channel-like distributor having two opposed arrays of spaced apart, parallel distribution channels 10 and 12, respectively. The distribution channels 10 and 12 are each of narrow box-like configuration having open top portions 13. A header 14 of also open box-like configuration is located between and connects the distribution channels 10 and 12 to feed the descending liquid thereto. As can best be seen in FIG. 3, open spaces 16 and 18 are defined between the distribution channels 10 and 12 for passage of the ascending vapor in the direction of arrowhead "C" shown in FIG. 1. An open pre-distribution box 20 is located within the header 14. Descending liquid is fed to the pre-distribution box 20 which has a bottom wall 22 having perforations 24. The descending liquid flows from the perforations into the header 14 and then out to the opposed arrays of spaced apart, parallel distribution channels 10 and 12. The header 14 and the distribution channels 10 and 12 have bottom walls 26, 28 and 30 respectively. As can best be seen in FIG. 3, such bottom walls 26, 28 and 30 are provided with perforations 32 from which the descending liquid is discharged from the distributor portion 2 and into the underlying packing bed in the general direction shown by arrowhead "B" in FIG. 1.

As shown in FIG. 1, the liquid descends from an overlying layer of packing to the collector portion 3 of the combined collector and distributor 1 in the direction indicated by arrowhead "A". Two rows 34 and 36 of collection elements 38 and 40 are provided that are configured to collect the descending liquid C within the distillation column. These rows 34 and 36 of collection elements 38 and 40 cover the open spaces 16 and 18, respectively, and also, the open top portions 13 the distribution channels 10 and 12, respectively, to prevent the descending liquid from by-passing the combined collector and distributor 1. The collection elements 38 and 40 within each of the two rows 34 and 36 alternate and preferably have a channel-like configuration in the form of an open box. As illustrated, such open box is open at one end and closed at the other end toward the column shell. With additional reference to FIG. 4, for example, a closed end of a collection element 38 is indicated by a reference number 42 and an open end thereof is indicated by a reference number 44. Collection element 40 is configured in the same manner as collection element 38.

With reference again to FIGS. 1 and 2, the descending liquid "A" is caught by the open collection elements 38 and 40 and flows in the direction of arrowhead "E" and out the open ends thereof (44 in case of a collection element 38) as indicated by arrowhead "F". The collection elements 38 and 40 are also staggered. As a result, the collection elements 38 and 40 alternate between higher and lower positions, respectively. The collection elements 38, at the higher positions are situated at locations above the open spaces 16 and 18 and thereby form chimney-like regions within the open spaces and below the collection elements 38 to enable ascending vapor flow through and out of openings, such as indicated by reference number 50, between the collection elements 38 and 40 as shown by arrowhead "D" in FIG. 1; and therefore, the combined collector and distributor 1. The collection elements 40, at the lower positions, are situated at locations above and cover the open top portions 13 of the distribution channels 10 and 12 to prevent the descending liquid from directly entering the box like channels 10 and 12 and thereby by-passing the collection portion 3 of the combined collector and distributor 1.

The rows 34 and 36 of the collection elements 38 and 40 are spaced apart from one another so as to form a rectangular region 52 between the two rows 34 and 36. Situated within the rectangular region 52 is a rectangular sump 54 which as illustrated is also in the form of an open box. The descending liquid caught in the collection elements 38 and 40 drains in the direction of arrowhead "F" into the rectangular sump 54. The rectangular sump 54 has a bottom opening 56 to discharge the descending liquid into the open pre-distribution box 20. As indicated above, the descending liquid flows from the open pre-distribution box 20 to the central header 14 and the parallel distribution channels 10 and 12 of the distributor portion 2. The rectangular sump 54 is connected to the box-like channels 10 and 12 at an inner end thereof.

Figure 5:
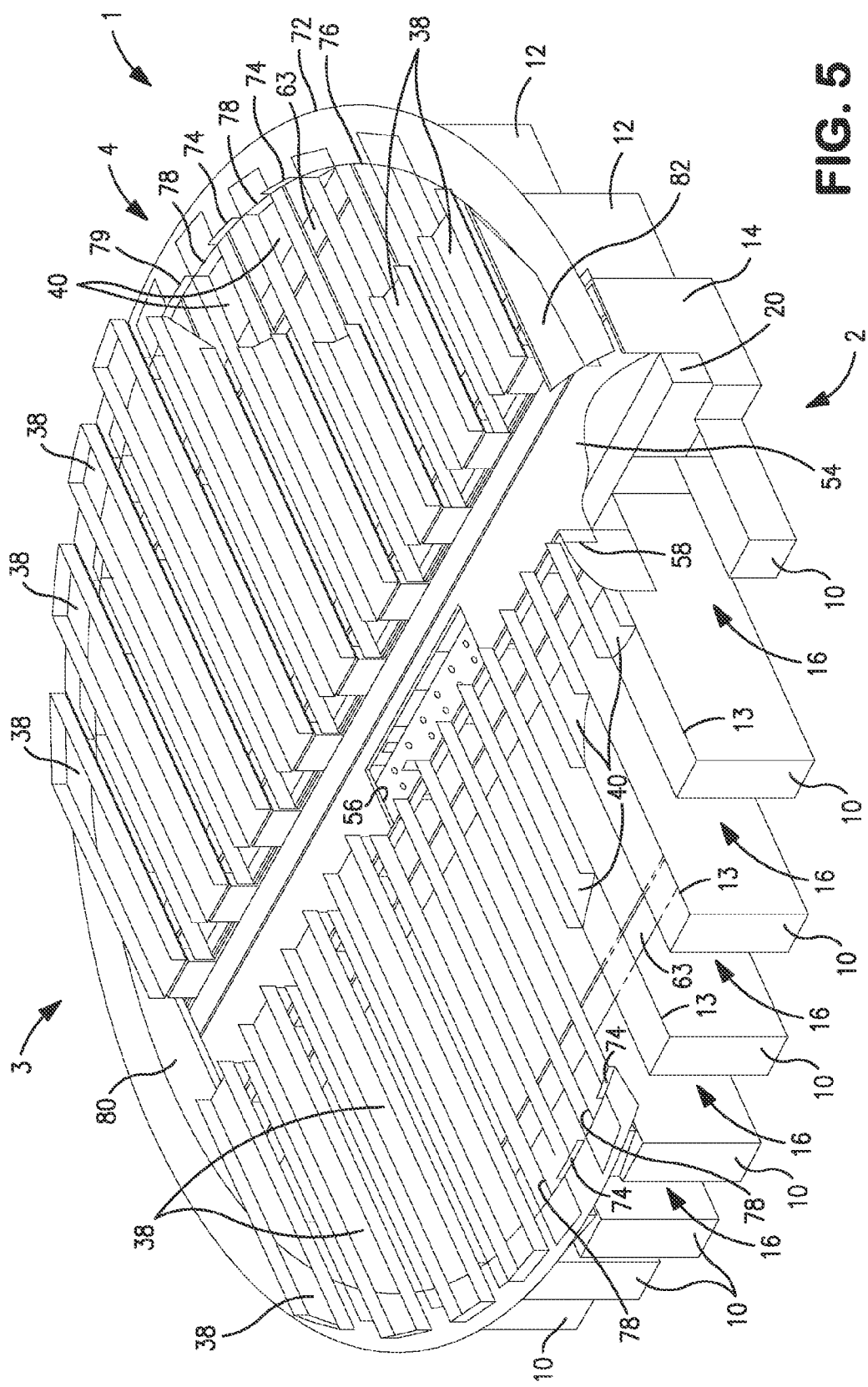
FIG. 5 is a schematic, perspective view of FIG. 1 with portions broken away to show details of a wiper band used in the combined collector and distributor shown in FIG. 1.

With additional reference to FIG. 5, although the collection elements 38 and 40 could be formed by one-piece construction, for instance, from a metal stamping or the like, preferably, the collection elements 38 and 40 are individual elements in the form of hats that are connected to one another. As used herein and in the claims, the term "hat" means an individual element that covers another elements which in case of the combined collector and distributor 1 would be the open spaces 16 and 18 and the open top portions 13 of the distribution channels 10 and 12. In this regard, the collection elements 40 are preferably connected to the top, open portions 13 of the parallel box like channels 10 and 12 and the rectangular sump 54 is connected to the parallel distribution channels 10 and 12 at inner ends and preferably within recessed portions 58 of the sidewalls thereof. The collection elements 38 are in turn connected to the collection elements 40 by means of tabs 60 which, at one end, are welded to the collection elements 40 and at the other end, are connected to the collection elements 38 by means of threaded connectors such as indicated by reference number 62. Although the distribution channels, 10 and 12 or the collection elements 38 and 40 could have the same length, preferably, as illustrated, such distribution channels 10,12 and the collection elements 38,40, have an ever increasing length, reaching a maximum length at a midpoint of each array and each row, as shown by arrowheads 64 and 66, and a minimum length at the ends of each of the arrays and each row as shown by arrowheads 68 and 70 such that outer regions of the collection elements 38 follow the inner curvature of a shell of the distillation column.

In order to prevent the descending liquid from by-passing the combined collector and distributor 1 at the inner wall of the distillation column, a wiper band 4 is provided that is also connected to the combined collector and distributor 1. Although a wiper band 4 could be provided as a separate element, it is preferably integrated into the construction of the combined collector and distributor 1. As illustrated, wiper band 4 is an annular, plate-like element that is sized such that it is able to contact the inner shell of the distillation column at its outer periphery 72 to collect the descending liquid flowing downwardly along such inner shell. Further, inner tab-like elements 74 are provided at an inner periphery 76 thereof and beneath the collection elements 38. The inner tab-like elements 74 are sized and spaced apart from one another to define openings 78 in registry with the collection elements 40. These openings 78, so formed, allow the descending liquid collected on the wiper band is directed only into the collection elements 40 and is prevented from flowing below the collection elements 38. The wiper band 4 is preferably provided with arcuate end portions 80 and 82 situated adjacent to the collection elements 38 at 68 and 70 to direct liquid at such locations into the rectangular sump 54 and also, to cover the open top portions 13 of the distribution elements 10 and 12 at the ends of the arrays at 68 and 70 and the header 14 at such locations. At such locations, the wiper band 4 is connected to the collection elements 38 by brackets 81, welded to the wiper band 4 and connected to the collection elements 38 by threaded connectors 83.

As would be known to those skilled in the art, combined collector and distributor 1 is connected to the shell or sidewall of the distillation column, at its inner surface thereof. Although not illustrated, tabs can be welded to the inside of the distillation column and channel beams can be attached by bolts to the combined collector and distributor 1 so as to contact the collection elements 38 and engage the tabs. The bolted or other threaded connection would allow the combined collector and distributor 1 to be precisely leveled within the distillation column.

Figure 6:
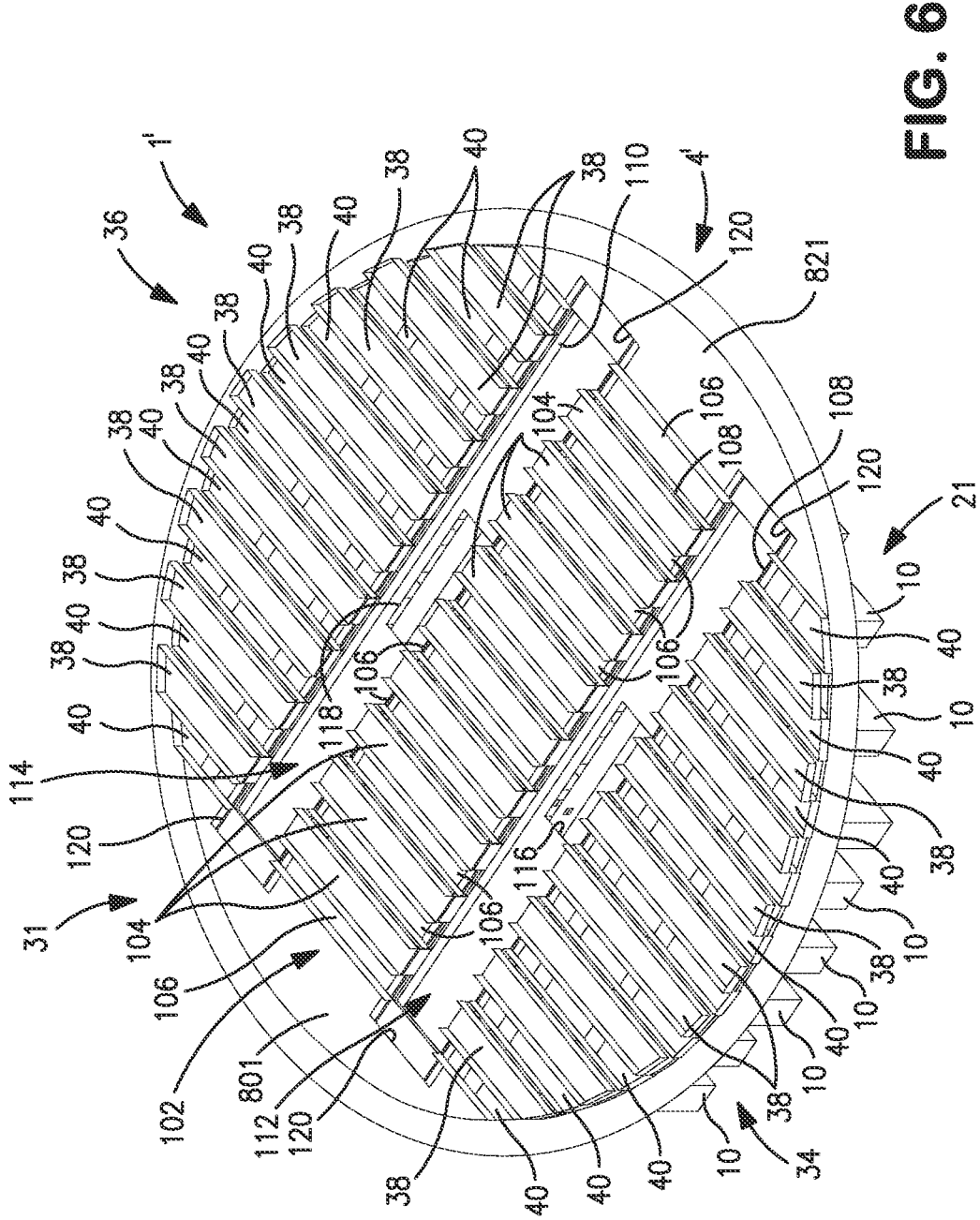
FIG. 6 is a top perspective view of an alternative embodiment of a combined collector and distributor in accordance with the present invention.
Figure 7:
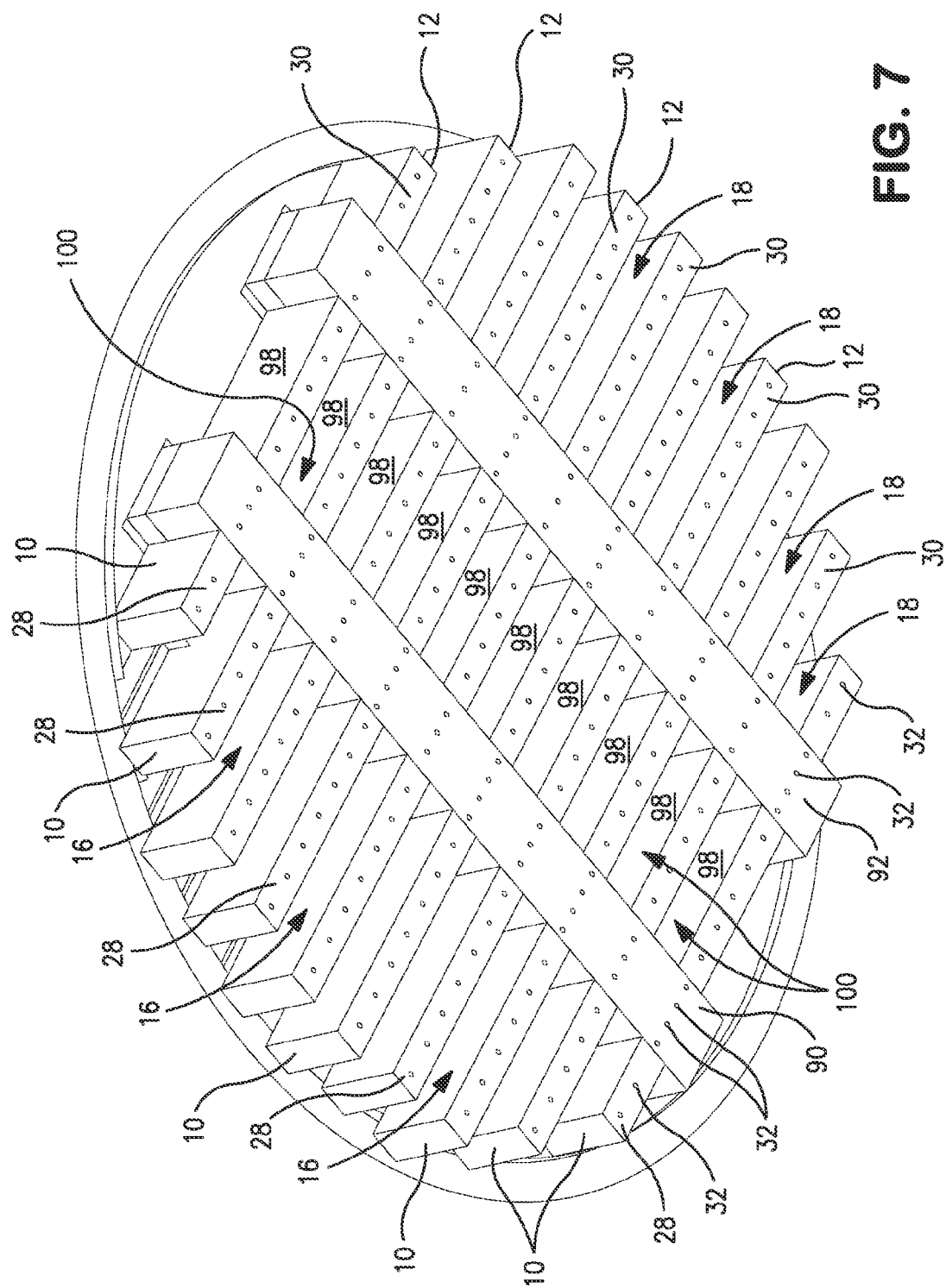
FIG. 7 is a bottom perspective view of the combined collector and distributor illustrated in FIG. 6.

With reference to FIGS. 6 and 7, a further embodiment of a combined collector and distributor 1' is illustrated that is designed to be used in wider distillation columns than the embodiment discussed above. In order to avoid needless repetition of explanation, elements shown in FIGS. 5-7 will have the same reference numbers as have been used in the discussion and illustrations of the combined collector and distributor 1 where the description of such elements is the same in both embodiments. The combined collector and distributor 1' is provided with a distributor portion 2', a collector portion 3' and a wiper band 4'.

The collector portion 2' has the two opposed arrays of spaced apart, parallel distribution channels 10 and 12, respectively which are connected to two parallel rectangular headers 90 and 92. Although not illustrated, two open pre-distribution boxes are located within the two, parallel, rectangular headers 90 and 92 which each are in the form of pre-distribution box 20 having openings 24 in a bottom wall thereof as has been illustrated and discussed with respect to combined collector and distributor 1. In order to span the distillation column diameter, a central array of spaced apart, parallel distribution channels 98 connects the two, parallel, rectangular headers 90 and 92. The two parallel rectangular headers and the central array of spaced apart, parallel open box like channels 98 have perforate bottom walls having perforations 34 as do the two opposed array of parallel box-like channels 10 and 12 for distribution of liquid to the underlying packing layer and additional open spaces 100 for the passage of the ascending vapor.

The distributor portion 3' has, in addition to the two rows 34 and 36 of collection elements 38 in the higher positions and 40 in the lower positions, an intermediate row 102 of the collection elements 104 and 106 covering the additional open spaces 100 and the central array of distribution channels 98, respectively. The collection elements 104 are situated in the higher positions to allow the escape of the ascending vapor from the additional open spaces 100 and out of openings 108 thereof. The collection elements 106 are mounted in the lower positions to cover the central array of distribution channels 98 to prevent liquid from by-passing the collection portion 3'. As illustrated, the intermediate row 102 of collection elements 104 and 106 is spaced between the two rows 34 and 36 of the collection elements 38 and 40 to provide two rectangular regions 108 and 110 within which are mounted two rectangular sumps 112 and 114 having bottom openings 116 and 118, respectively. The collection elements 104 and 106 are open at opposite ends and allow the descending liquid to drain from such elements into both rectangular sumps 112 and 114 and out the bottom openings 116 and 118 thereof. The descending liquid then enters the two open pre-distribution boxes situated within the headers 90 and 92 and then, the two parallel rectangular headers 90 and 92. Liquid flows from the two parallel rectangular headers 90 and 92 to the connected parallel distribution channels 10 and 12 and the central array of open box like channels to be distributed to the underlying packing bed by means of the perforations 34.

The collection elements 106 can be connected to the central array of box like channels and the collection elements 104 can be connected to the collection elements 106 by means of tabs connected to collection elements 106 and bolted to the collection elements 104 in the same manner as has been illustrated above with respect to the collection elements 38 and 40. Furthermore, the two rectangular sumps 112 and 114 are connected to the box-like channels 10 and 12 and the central array of open box like channels 98 at the top portions thereof in the same manner as scribed above with respect to rectangular sump 54.

The wiper band 4' is similar to the wiper band described above but is sized larger to contact the wider distillation column. Although not illustrated, wiper band 4' is provided with tabs at its inner periphery to direct the descending liquid into the collection elements 40. Given the larger size of wiper band 4' and the use of two sumps 112 and 114, the arcuate end sections 80' and 82' thereof have recessed end portions 120 to direct liquid into the two sumps 112 and 114.

While the present invention has been described in reference to preferred embodiments, as will occur to those skilled in the art, numerous changes, additions and omissions can be made thereto without departing from the spirit and scope of the invention as set forth in the appended claims.

What is claimed is:

1. A combined collector and distributor for collecting a descending liquid from an overlying packing bed within a distillation column and distributing the descending liquid to an underlying packing bed within the distillation column, the combined collector and distributor comprising:
    at least two arrays of a plurality of spaced-apart distribution channels, the plurality of distribution channels having an open top portion and a perforated bottom wall to distribute the descending liquid to the underlying packing bed within the distillation column, the at least two arrays of distribution channels defining open spaces between adjacent distribution channels for passage of an ascending vapor from the underlying packing bed within the distillation column;
    one or more headers connected to and disposed between the adjacent arrays of distribution channels, the one or more header having an open top portion and a perforated bottom wall and configured to feed the descending liquid to the plurality of distribution channels in the at least two arrays;
    at least one pre-distribution box having an open top portion and a perforated bottom wall disposed, the at least one pre-distribution box disposed adjacent to the one or more headers and configured to distribute the descending liquid to the one or more headers;
    a plurality of collection elements configured to collect the descending liquid from the overlying packing bed within the distillation column, the plurality of collection elements covering the open spaces between adjacent distribution channels and the open top portions of the distribution channels,
    the plurality of collection elements having an open end and further configured to direct the collected descending liquid from the open end to a sump region, the sump region having a bottom opening to discharge the descending liquid into the at least one pre-distribution box; and
    wherein the collection elements are further disposed in a staggered orientation wherein some of the collection elements are disposed at higher positions above the open spaces or above the open top portions of the distribution channels and some of the collection elements are disposed at lower positions above the open spaces or above the open top portions of the distribution channels to enable ascending vapor flow through the combined collector and distributor.

2. The combined collector and distributor of claim 1, wherein the combined collector and distributor is connected to a shell or sidewall of the distillation column, at its inner surface thereof and the arrangement of the collection elements have outer regions that follow the inner curvature of the shell or sidewall of the distillation column.

3. The combined collector and distributor of claim 1, wherein the distribution channels in each of the at least two arrays have an ever increasing length, reaching a maximum length proximate a midpoint of each array and a minimum length proximate the ends of each of the arrays.

4. The combined collector and distributor of claim 1, further comprising a wiper band comprising:
    a plate-like element, at its outer periphery, in contact with a shell or sidewall of the distillation column to collect the descending liquid flowing downwardly along the shell or sidewall of the distillation column and, at is inner surface, situated between the collection elements in the higher positions and the lower positions;
    inner tab-like elements located at the periphery of the plate-like element and beneath the collection elements in the higher positions to define openings in registry with the collection elements located at the lower positions to so that the descending liquid collected on the plate-like element is directed only into the collection elements located at the lower positions and is prevented from flowing below the collection elements located at the upper positions; and
    the plate-like element has two opposed end sections adjacent the outermost of the collection elements of the two rows of collection elements.

5. The combined collector and distributor of claim 1, wherein the collection elements disposed at higher positions are disposed above the open spaces and the collection elements disposed at lower positions are disposed above the open top portions of the distribution channels.

6. The combined collector and distributor of claim 1, wherein the collection elements disposed at lower positions are disposed above the open spaces and the collection elements disposed at higher positions are disposed above the open top portions of the distribution channels.

7. The combined collector and distributor of claim 1, wherein the at least two arrays of the plurality of spaced-apart distribution channels further comprises two equally sized, opposed arrays of spaced apart, parallel distribution channels connected to a single rectangular header disposed between the two opposed arrays of distribution channels.

8. The combined collector and distributor of claim 1, wherein the at least two arrays of the plurality of spaced-apart distribution channels further comprises three arrays of a plurality of spaced-apart distribution channels connected to two headers disposed between the adjacent arrays of distribution channels.

9. A method for collecting a descending liquid from an overlying packing bed within a distillation column and distributing the descending liquid to an underlying packing bed within the distillation column, the method comprising the steps of:
    collecting a descending liquid from the overlying packing bed within the distillation column in a plurality of collection elements,
    directing the collected descending liquid from the plurality of collection elements to a sump region;
    discharging the descending liquid from a bottom opening in the sump region into at least one pre-distribution box, the at least one pre-distribution box having an open top portion and a perforated bottom wall;
    distributing the descending liquid from the perforated bottom wall of at least one pre-distribution box to one or more headers via an open top portion of one or more headers;
    feeding the descending liquid from the one or more headers to a plurality of distribution channels arranged in at least two arrays of distribution channels and defining open spaces between adjacent distribution channels for passage of an ascending vapor from the underlying packing bed within the distillation column, the distribution channels having an open top portion and a perforated bottom wall;

distributing the descending liquid through the perforated bottom walls of the plurality of distribution channels to the underlying packing bed within the distillation column;

wherein the one or more headers are connected to and disposed between the adjacent arrays of distribution channels, the one or more header having an open top portion and a perforated bottom wall and wherein the at least one pre-distribution box has an open top portion in fluid communication with the sump region and a perforated bottom wall disposed adjacent to or within the one or more headers and configured to distribute the descending liquid to the one or more headers; and wherein the plurality of collection elements are arranged so as to cover the open spaces between adjacent distribution channels and the open top portions of the distribution channels and further arranged in a staggered orientation wherein some of the collection elements are disposed at higher positions above the open spaces or the open top portions of the distribution channels and some of the collection elements are disposed at lower positions above the open spaces or the open top portions of the distribution channels to enable ascending vapor flow through the combined collector and distributor.

\* \* \* \* \*